Patented Jan. 1, 1952

2,581,285

UNITED STATES PATENT OFFICE 2,581,285

QUATERNARY AMMONIUM SALTS OF MORPHOLYL ETHERS

Joseph B. Niederl, Brooklyn, and Victor Niederl, Round Top, N. Y., and Martin E. McGreal, Somersworth, N. H., assignors, by direct and mesne assignments, to J. B. Niederl and Associates, Inc., New York, N. Y., a corporation of New York No Drawing. Application June 28, 1946, Serial No. 680,070

5 Claims. (Cl. 260—247.1)

This invention relates to quaternary ammonium salts of β-4-morpholyl-ethyl-alkyl ethers in which the O-alkyl group is an aliphatic radical $C_nH_{2n-1}$ containing from 12 to 18 carbon atoms. More specifically, this invention relates to potent bactericidal agents in which this O-alkyl radical is a myristyl tetradecyl radical.

The β-4-morpholyl-ethyl-alkyl ethers which form the starting materials in this invention are prepared by the action of a long chain alkyl halide, such as lauryl-, myristyl-, cetyl-, or octadecyl halides, upon the sodium salt of β-4-morpholine ethanol as follows:

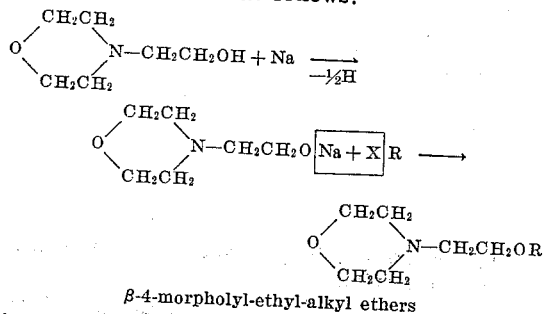

β-4-morpholyl-ethyl-alkyl ethers in which $R=-C_{10}H_{21}$; $-C_{12}H_{25}$; $-C_{14}H_{29}$; $-C_{16}H_{33}$; and $-C_{18}H_{37}$.

These ethers are then converted into the respective quaternary ammonium salts by the addition of appropriate reagents such as alkyl halides or dialkyl sulfates as follows:

Halides:

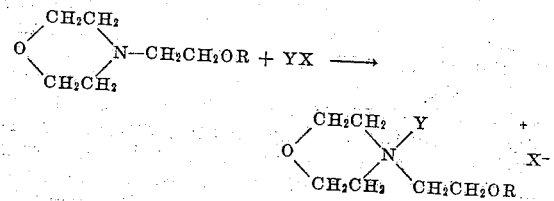

Alkyl-sulfates:

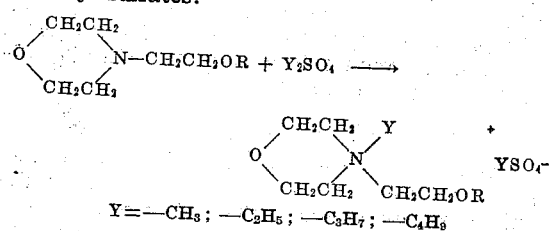

$Y=-CH_3$; $-C_2H_5$; $-C_3H_7$; $-C_4H_9$.

In the formation of the quaternary ammonium salts as illustrated above, it is usually not necessary to use solvents in carrying out the reactions of this invention; solvents or diluents may be used, including esters, such as ethyl acetate; hydrocarbons, such as benzene, toluene, petroleum ether, and the like; alcohols, such as ethyl and methyl alcohol; ethers, such as diethyl and diisopropyl ethers; and like inert solvents. In a special embodiment of the invention, the reaction is carried out in the presence of a solvent which dissolves the reactants but precipitates out the reaction products, especially if the solvent is cool. When operating in this manner, the salts may be separated out in a purified form without the necessity of removing the solvent. Various solvents may serve this dual purpose as a homogenizing and a crystallizing medium. For practical reasons, ethyl acetate seems to be the most appropriate solvent of this type. It shoud be understood, therefore, that claims directed to reactions taking place in the presence of ethyl acetate encompass such equivalents.

In accordance with one embodiment of the invention, temperatures are regulated in such a manner that the reactants are retained in a liquid phase during the reaction. Generally speaking, water or steam baths provide sufficiently high temperatures for such a purpose.

When the reactants are mixed together without diluents or solvents, suitable concentrated aqueous solutions of the reaction product may be formed merely by the addition of water without the necessity of expensive separatory, crystallizing or purifying steps.

The following examples disclose illustrative embodiments of the invention but are not to be considered a limitation upon it.

*Example I.—β-4-morpholyl ethyl myristyl ether*

Sixty grams of β-4-morpholine ethanol are placed into a three-necked round-bottomed flask equipped with a water-cooled reflux condenser, a dropping funnel, and a mechanical stirrer. The amino-alcohol is then heated to 110–120° C., a temperature which is maintained throughout the entire reaction.

After reaching this temperature 2 grams of metallic sodium are added in small portions through the condenser. After the reaction has ceased, 25 cc. of myristyl bromide are slowly added through the dropping funnel. After allowing the reaction to proceed for twenty minutes, a second portion of 2 grams of metallic sodium is gradually added as described above. This is followed by the slow addition of 32 cc. of myristyl bromide. After another thirty minutes, during which time reaction had nearly ceased, a final portion of 4 grams of metallic sodium is gradually added again, and this is followed by 57 cc. of myristyl bromide. The mixture is then allowed to continue to react at 110° C. for an additional hour, after which time the heating is discontinued and the flask allowed to come to room temperature.

The reaction mixture is then taken up in 100 cc. of diethyl ether or any other water insoluble diluent and thereafter is filtered to remove the sodium bromide formed in the reaction. The filtrate is next washed three times with 40 cc. portions of water to extract unreacted β-4-morpholine ethanol. The diethyl ether layer is then dried with anhydrous potassium carbonate. After standing for twenty-four hours, the solvent is distilled off on a steam bath.

The remaining viscous liquid is fractionally distilled under reduced pressure. The β-4-morpholyl - ethyl - myristyl ether is collected at 205–208° at 2 mm. pressure.

In a similar manner and by substituting for the myristyl halide the corresponding lauryl-, cetyl-, or octadecyl halide, the following β-4-morpholyl-ethyl-alkyl ethers were prepared:

β-4-morpholyl-ethyl-lauryl ether---- B. P. 200–202°/2 mm.
β-4-morpholyl-ethyl-cetyl ether---- B. P. 215–220°/2 mm.
β-4-morpholyl-ethyl-octadecyl ether_ B. P. 226–231°/2 mm.

Of the foregoing amino-ethers the following derivatives were prepared using standard methods:

|  | HCl M. P., °C. | HBr M. P., °C. | Oxalate M. P., °C. | Picrate M. P., °C. |
|---|---|---|---|---|
| β-4-morpholyl-ethyl-lauryl ether | 97 | 105 | 108 | 62 |
| β-4-morpholyl-ethyl-myristyl ether | 112 | 115 | 109 | 80 |
| β-4-morpholyl-ethyl-cetyl ether | 105 | 112 | 112 | 78 |
| β-4-morpholyl-ethyl-octadecyl ether | 108 | 114 | 115 | 82 |

*Example II.—N-methyl-N-(β-myristoxy)-ethyl morpholinium iodide*

Ten grams of β-4-morpholyl-ethyl-myristyl ether are dissolved in 150 cc. of dry diethyl ether. To this solution are added 20 cc. of methyl iodide. The flask containing this mixture is then stoppered and allowed to stand for two days. During this time the crystalline methiodide having the formula

$$O[CH_2CH_2]_2\overset{+}{N}[CH_3]CH_2CH_2OC_{14}H_{29}I^-$$

gradually settled out. The crystals were filtered off and recrystallized from ethyl acetate. The recrystallized product had a melting point of 73° C.

The same compound may also be produced without the use of a diluent. The product is readily soluble in warm water. Its phenol coefficient proved to be the same as the N-myristyl-N-benzyl morpholinium halides described in application Serial No. 471,024, filed January 1, 1943, now Patent No. 2,406,892.

In the same manner as described above, the β-4-morpholyl-ethyl-lauryl, cetyl, and octadecyl ethers are converted into the methiodides respectively having melting points of 56°, 80°, and 88° C. which, however, have a substantially lower phenol coefficient.

*Example III.—N-methyl-N-(β-myristoxy)-ethyl morpholinium methosulfate*

One mol of β-4-morpholyl-ethyl-myristyl ether is introduced into an appropriate reaction vessel provided with a thermometer, a mechanical stirrer, and a dropping funnel. Thereafter, one mol of dimethyl sulfate is gradually added under constant stirring. The addition of the dimethyl sulfate is preferably regulated, so that the reaction mixture remains liquid throughout the reaction period. Upon the completion of the addition, the reaction product having the formula

$$O[CH_2CH_2]_2\overset{+}{N}[CH_3]CH_2CH_2OC_{14}H_{29}CH_3SO_4^-$$

is allowed to cool and is then crystallized from ethyl acetate. The recrystallized reaction product has a melting point of 65° C.

The reaction may also be carried forward in the presence of solvents which do not enter into the reaction. Thus the initial amino-ether may be diluted with 2 parts of ethyl acetate, and a temperature of 50–55° C. is then maintained throughout the reaction. Instead of ethyl acetate also alcohols (ethyl alcohol, and so forth) or dialkyl ethers (diethyl ether, diisopropyl ether, and so forth) may be used.

In the same manner as described above, the β-4-morpholyl-ethyl-lauryl, cetyl, and octadecyl ethers are converted into the respective N-methyl-N-[β-dodecyloxy-, β-hexadecyloxy-, or β-octadecyloxy - ] - ethyl-morpholinium methosulfates having respective melting points of 55°, 78°, and 89° C.

Again, as in the case of Example II the "myristyl" or tetradecyloxy compound has the highest phenol coefficient.

*Example IV.—N-ethyl-N-(β-myristoxy)-ethyl morpholinium etho-sulfate*

One mol of diethyl sulfate is gradually added to one mol of β-4-morpholyl-ethyl-myristyl ether, contained in an appropriate reaction vessel provided with a reflux condenser, a thermometer, and mechanical stirrer. After completion of the addition of the diethyl sulfate, the reactants are heated on a steam bath for twenty-four hours to 100° C., or until the reaction mixture has acquired the tendency to completely solidify upon cooling. Then the reaction mixture is left standing at room temperature for an additional twenty-four hours, during which time the material usually becomes a solid, waxy mass. The reaction mass is then washed with an organic solvent in which it is not soluble, for example, diethyl ether, diisopropyl ether, and so forth, or the product is crystallized from a suitable solvent. The ethosulfate, having the formula

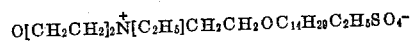
$$O[CH_2CH_2]_2\overset{+}{N}[C_2H_5]CH_2CH_2OC_{14}H_{29}C_2H_5SO_4^-$$

shows a higher rate of solubility in water as well as in organic solvents than any other of the quaternary ammonium salts of this series.

Substituting the homologous lauryl-, cetyl-, or octa-decyl ethers for the above myristyl ether produced the corresponding ethosulfates which are low melting waxes very soluble in water. None of these higher alkyl derivatives, however, has the same high bactericidal power as the myristyl compound.

Substitution of higher symmetrical dialkyl sulfates, such as di-n-butyl, di-n-hexyl, and so forth, produced the corresponding quaternary higher alkyl sulfates, while utilization of mixed dialkyl sulfates, such as methyl-ethyl sulfate, ethyl-n-butyl sulfate, and so forth, produced the corresponding asymmetric quaternary ester salts of the type described in U. S. Patent No. 2,380,325, exhibiting intramolecularly synchronized properties as to solubility and crystallinity.

The prior art has taught that the maximum bactericidal properties of quaternary ammonium salts are obtained when such compounds contain an alkyl substituent of 16 carbon atoms. We have discovered that compounds of the type disclosed in this application particularly the quaternary salts thereof have their optimum potency when the O-alkyl radical contains 14 carbon atoms without the presence of any aryl radical whatsoever.

This latter fact then indicates that interruption of the pertinent alkyl radical by ether-oxygen atoms has no deleterious effect on the physiological potency of the quaternary ammonium salts. It thus also becomes apparent that the position of the ether-oxygen atom, or atoms, in the alkyl chain is immaterial, as long as the total number of carbon atoms in this alkyl chain is 16. Thus the following types of compounds still fall within the scope of this invention, i. e.:

Mono-ethers

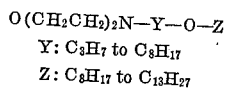

Y: $C_3H_7$ to $C_8H_{17}$
Z: $C_8H_{17}$ to $C_{13}H_{27}$

Poly-ethers

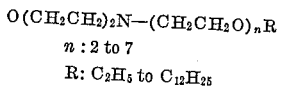

$n$ : 2 to 7
R: $C_2H_5$ to $C_{12}H_{25}$

This also includes compounds in which the O-radical is an equivalent branched aliphatic chain or a cycloaliphatic group.

It will be understood that the embodiments of our invention described in the specification and illustrated by the examples are only illustrative of the compounds and the processes by which they are produced. Various modifications can be made without departing from the principles of the invention.

We claim:

1. A new compound, N-methyl-N-β-myristoxyethyl morpholinium metho-sulfate.
2. A new compound, N-methyl-N-β-myristoxyethyl morpholinium etho-sulfate.
3. A new compound, N-ethyl-N-β-myristoxyethyl morpholinium metho-sulfate.
4. A new compound, N-ethyl-N-β-myristoxyethyl morpholinium etho-sulfate.
5. A neutral, water soluble, capillary-active and substantially acid and alkali-stable disinfecting N-alkyl-N-(B-alkoxy)ethyl morpholinium alkyl sulfate having the formula

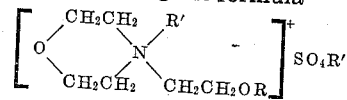

wherein R is an unsubstituted straight chain alkyl hydrocarbon radical of from 12–18 carbon atoms and R' is an alkyl chain consisting of a continuous saturated aliphatic hydrocarbon chain of from 1–2 carbon atoms.

JOSEPH B. NIEDERL.
VICTOR NIEDERL.
MARTIN E. McGREAL.

REFERENCES CITED

The following references are of record in the file of this patent:

UNITED STATES PATENTS

| Number | Name | Date |
|---|---|---|
| 2,295,504 | Shelton | Sept. 8, 1942 |

OTHER REFERENCES

Jour. of the Proceedings of Royal Soc. of New South Wales, pp. 22–28 (1939).

Chem. Abstracts 34, 6288, citing J. A. C. S., 1940, pp. 1448–1450.